(12) United States Patent
More

(10) Patent No.: US 12,423,842 B2
(45) Date of Patent: Sep. 23, 2025

(54) INFORMATION PROCESSING METHOD AND STORAGE MEDIUM FOR ESTIMATING CAMERA POSE USING MACHINE LEARNING MODEL

(71) Applicant: HONDA MOTOR CO., LTD., Tokyo (JP)

(72) Inventor: Amit Popat More, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 461 days.

(21) Appl. No.: 17/870,928

(22) Filed: Jul. 22, 2022

(65) Prior Publication Data

US 2023/0033466 A1 Feb. 2, 2023

(30) Foreign Application Priority Data

Jul. 27, 2021 (JP) ................. 2021-122628

(51) Int. Cl.
*G06T 7/55* (2017.01)
(52) U.S. Cl.
CPC ...... *G06T 7/55* (2017.01); *G06T 2207/20081* (2013.01); *G06T 2207/30252* (2013.01)
(58) Field of Classification Search
CPC ............. G06T 7/55; G06T 2207/20081; G06T 2207/30252
See application file for complete search history.

(56) References Cited

U.S. PATENT DOCUMENTS

2023/0281862 A1* 9/2023 Urfalioglu ................ G06T 7/55
382/106

FOREIGN PATENT DOCUMENTS

WO WO-2019224140 A1 * 11/2019 ........... G06T 11/008
WO WO-2022052782 A1 * 3/2022

OTHER PUBLICATIONS

Hou, Computing CNN Loss and Gradients for Pose Estimation with Riemannian Geometry, arXiv:1805.01026v3 [cs.CV] Jul. 17, 2018 (Year: 2018).*
Guizilini, V. et al., "3D Packing for Self-Supervised Monocular Depth Estimation", arXiv: 1905.02693 v4 [cs.CV] Mar. 28, 2020, URL: https://arxiv.org/pdf/1905.02693.pdf, cited in Specification (13 pages).

(Continued)

*Primary Examiner* — Vu Le
*Assistant Examiner* — Lei Zhao
(74) *Attorney, Agent, or Firm* — WHDA, LLP

(57) ABSTRACT

An method comprises predicting a depth map by inputting a first image or a second image paired with the first image to a first machine learning model, predicting relative movement and rotation of an image capturing device using a second machine learning model, and generating a first converted image in which image conversion based on the predicted relative movement and rotation and the depth map is applied to the first image. The method also comprises calculating a loss including an error between the first converted image and the second image, and repeatedly predicting the relative movement and rotation by inputting a gradient of the loss, the first converted image, and the first image and the second image to the second machine learning model, and converging the loss including the error between the new first converted image and the second image.

8 Claims, 9 Drawing Sheets

(56) References Cited

OTHER PUBLICATIONS

Godard, C. et al., "Digging Into Self-Supervised Monocular Depth Estimation", arXiv: 1806.01260 v4 [cs.CV] Aug. 17, 2019, URL: https://arxiv.org/pdf/1806.01260.pdf, cited in Specification (18 pages).
Flynn, J. et al., "DeepView: View Synthesis with Learned Gradient Descent", arXiv: 1906.07316 v1 [cs.CV] Jun. 18, 2019, URL: https://arxiv.org/pdf/1906.07316.pdf, cited in Specification (10 pages).

\* cited by examiner

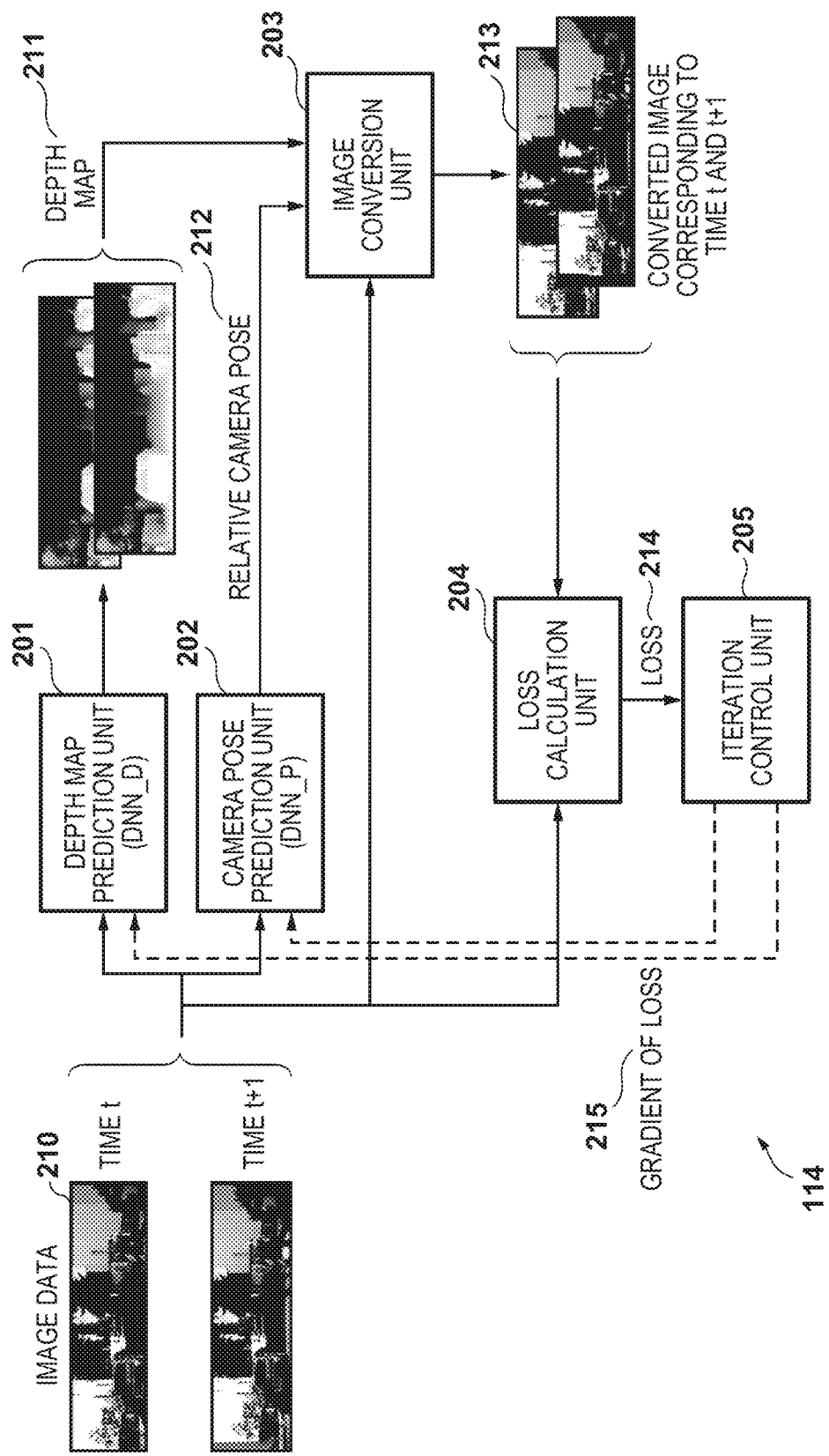

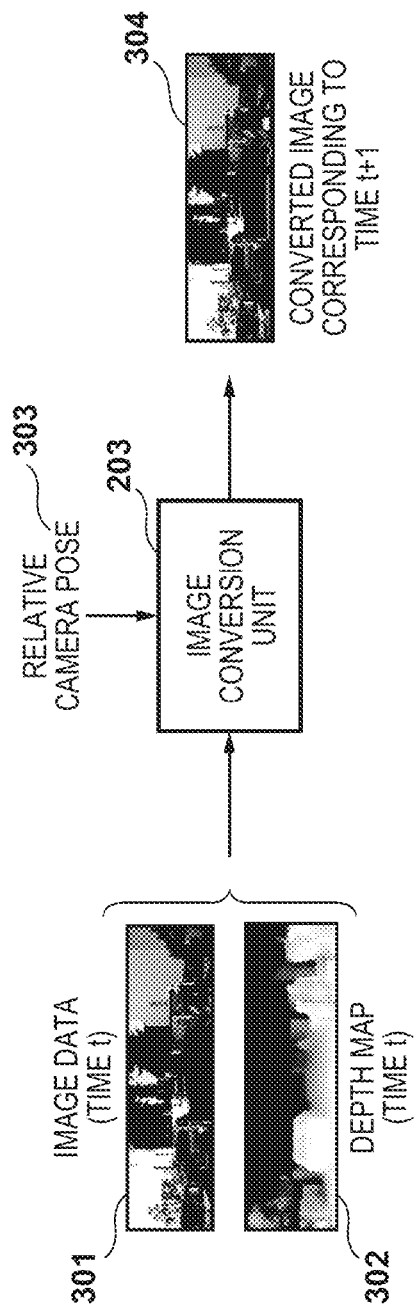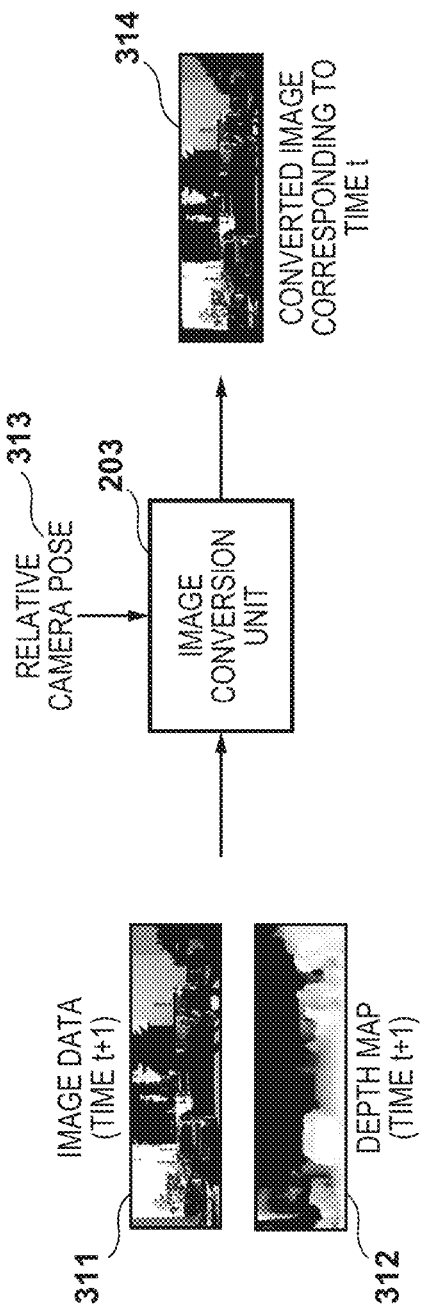

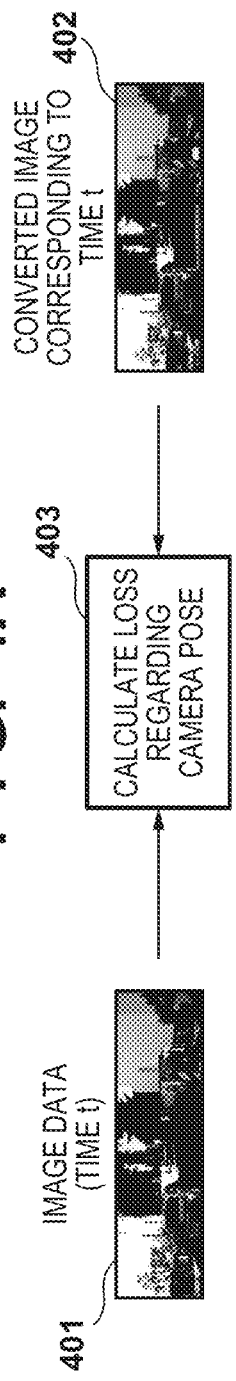
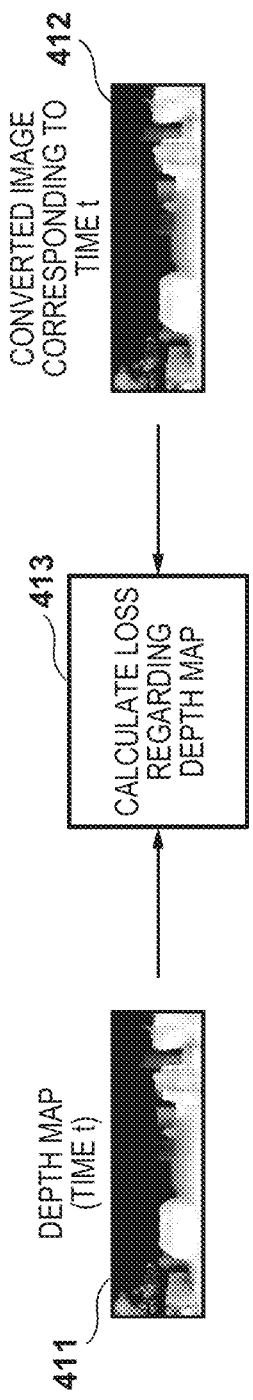

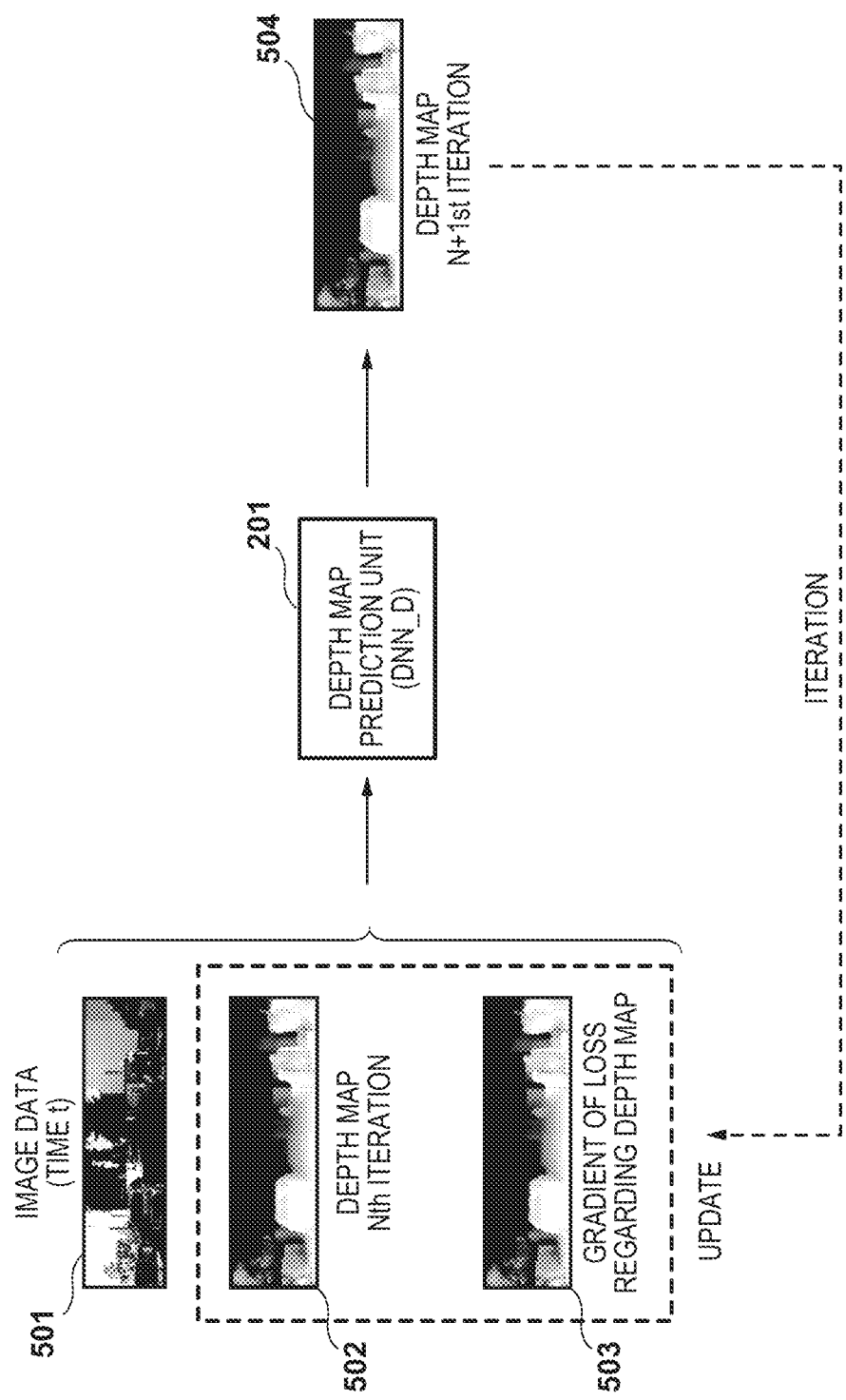

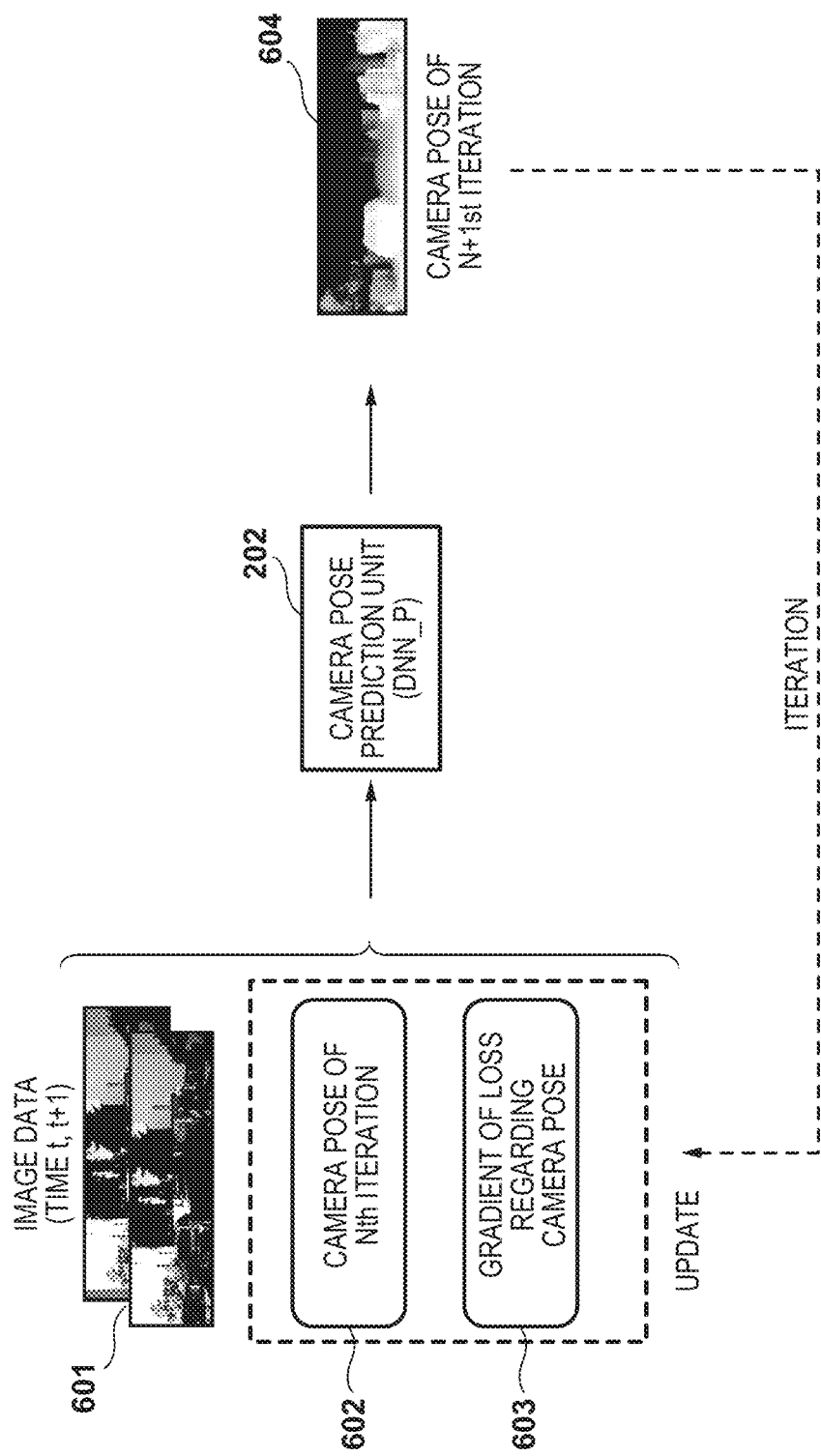

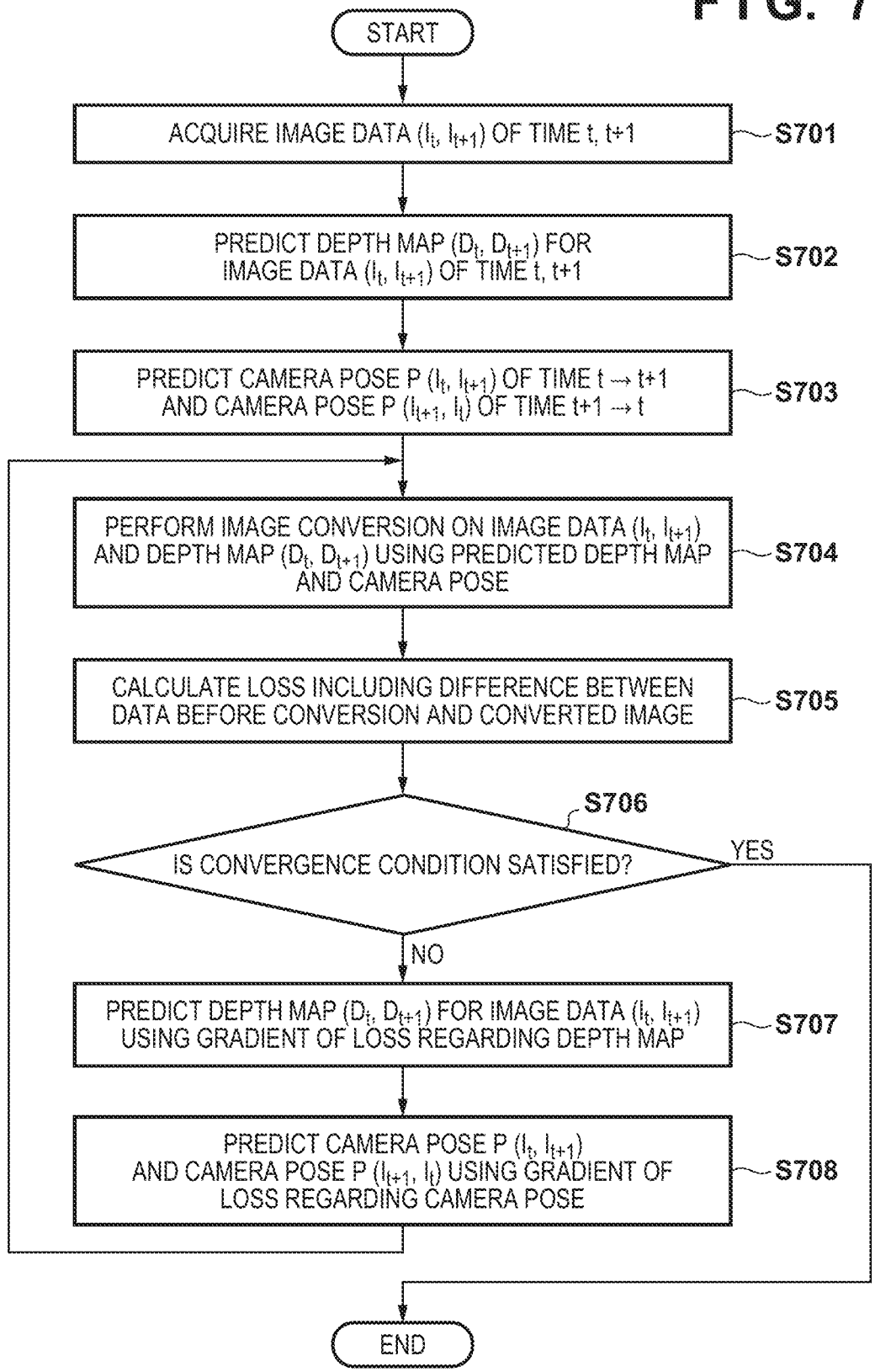

INFORMATION PROCESSING METHOD AND STORAGE MEDIUM FOR ESTIMATING CAMERA POSE USING MACHINE LEARNING MODEL

CROSS-REFERENCE TO RELATED APPLICATION(S)

This application claims priority to and the benefit of Japanese Patent Application No. 2021-122628 filed on Jul. 27, 2021, the entire disclosure of which is incorporated herein by reference.

BACKGROUND OF THE INVENTION

Field of the Invention

The present invention relates to an information processing method and a storage medium.

Description of the Related Art

In recent years, there has been known a technique of inputting an image captured by a camera to a deep neural network (DNN) and estimating a depth in the image and a camera pose (relative movement and rotation of an image capturing device that captures two images) by DNN inference processing (Vitor Guizilini and three others, "3D Packing for Self-Supervised Monocular Depth Estimation", arXiv: 1905.02693 v4 [cs.CV] 28 Mar. 2020 (https://arxiv.org/pdf/1905.02693.pdf)(Vitor), and Clement Godard and three others, "Digging Into Self-Supervised Monocular Depth Estimation", arXiv: 1806.01260 v4 [cs.CV] 17 Aug. 2019 (https://arxiv.org/pdf/1806.01260.pdf)(Clement)). In order to estimate a relative camera pose by a conventional (manual) estimation method (without using a DNN), it is necessary to estimate a correspondence between two images and then solve a camera pose and a depth map suitable for the correspondence between the images as an optimization problem. However, the method using the DNN makes it possible to obtain a more accurate estimation result in estimating the correspondence between the images and the depth.

On the other hand, in the technique proposed by Vitor and Clement, there is a problem that high performance is not obtained for the camera pose as compared with a case of estimating the relative camera pose by the conventional (manual) estimation method (without using the DNN).

By the way, in the inference processing using the DNN, a technique has been known in which a design related to parameter change of a gradient descent method (for example, a learning coefficient, normalization, or the like) is replaced with a DNN by inputting a gradient of a loss based on an output of the DNN to the DNN and performing an iterative operation. John Flynn and seven others, "DeepView: View Synthesis with Learned Gradient Descent", arXiv: 1906.07316 v1 [cs.CV] 18 Jun. 2019 (https://arxiv.org/pdf/1906.07316.pdf)(John) have proposed a technique of performing an operation of inputting a gradient of a loss to one DNN (CNN), generating a plurality of images (multiplane images) for each depth from images captured from a plurality of viewpoints, and generating a composite image of new viewpoints that are not present in the captured images. The technique proposed by Vitor and Clement described above is merely a technique of estimating a camera pose or the like by a single DNN operation, and the technique proposed by John does not consider a configuration of estimating a camera pose.

SUMMARY OF THE INVENTION

The present disclosure has been made in consideration of the aforementioned issues, and realizes an estimation technique capable of improving estimation accuracy of a camera pose in a case where the camera pose is estimated using a machine learning model.

In order to solve the aforementioned issues, one aspect of the present disclosure provides an information processing method executed in an information processing apparatus, the method comprising: predicting a depth map by inputting a first image or a second image paired with the first image to a first machine learning model; predicting relative movement and rotation of an image capturing device that captures the first image and the second image by inputting the first image and the second image to a second machine learning model; generating a first converted image in which image conversion based on the predicted relative movement and rotation from the first image to the second image and the depth map predicted for the first image is applied to the first image; calculating a loss including an error between the first converted image and the second image; and repeatedly predicting the relative movement and rotation by inputting a gradient of the loss regarding the relative movement and rotation, the first converted image, and the first image and the second image to the second machine learning model, and converging the loss including the error between the new first converted image and the second image based on the newly predicted relative movement and rotation.

Another aspect of the present disclosure provides, a non-transitory computer-readable storage medium storing a program for causing a computer to execute each step of an information processing method executed in an information processing apparatus, the information processing method comprising: predicting a depth map by inputting a first image or a second image paired with the first image to a first machine learning model; predicting relative movement and rotation of an image capturing device that captures the first image and the second image by inputting the first image and the second image to a second machine learning model; generating a first converted image in which image conversion based on the predicted relative movement and rotation from the first image to the second image and the depth map predicted for the first image is applied to the first image; calculating a loss including an error between the first converted image and the second image; and repeatedly predicting the relative movement and rotation by inputting a gradient of the loss regarding the relative movement and rotation, the first converted image, and the first image and the second image to the second machine learning model, and converging the loss including the error between the new first converted image and the second image based on the newly predicted relative movement and rotation.

According to the present invention, it is possible to improve estimation accuracy of a camera pose in a case where the camera pose is estimated using the machine learning model.

BRIEF DESCRIPTION OF THE DRAWINGS

FIG. 2 is a diagram for explaining depth map prediction and camera pose prediction in a model processing unit according to the first embodiment;

FIG. 3A is a diagram for explaining image conversion (from time t to time t+1) according to the first embodiment;

FIG. 3B is a diagram for explaining image conversion in a reverse direction (from the time t+1 to the time t) according to the first embodiment;

FIG. 4A is a diagram for explaining a predicted camera pose loss according to the first embodiment;

FIG. 4B is a diagram for explaining a predicted depth map loss according to the first embodiment;

FIG. 5 is a diagram for explaining depth map prediction with iteration according to the first embodiment;

FIG. 6 is a diagram for explaining camera pose prediction with iteration according to the first embodiment;

FIG. 7 is a flowchart illustrating a series of operations of prediction processing (of a camera pose and a depth map) in the model processing unit according to the first embodiment;

DESCRIPTION OF THE EMBODIMENTS

Figure 1:
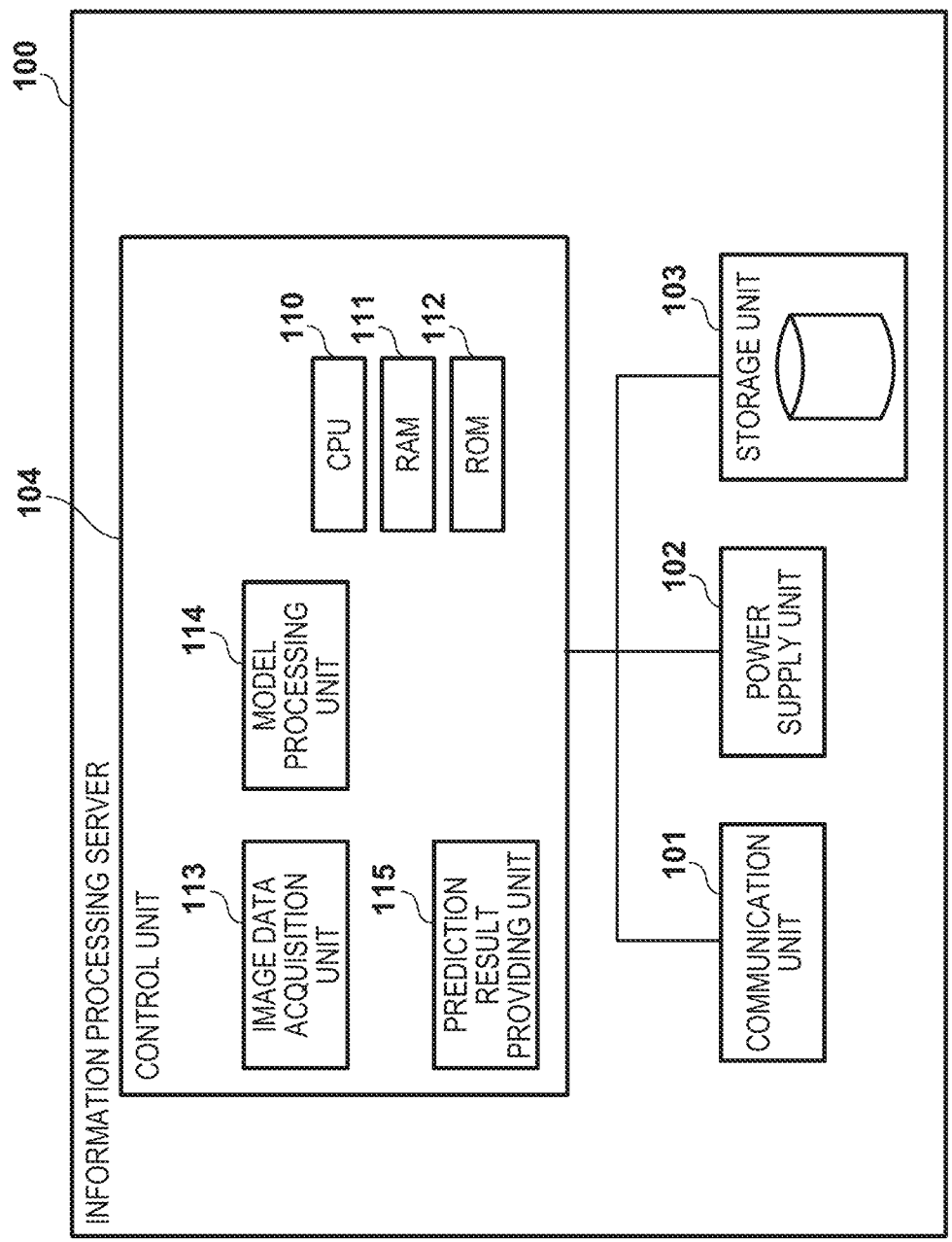
FIG. 1 is a block diagram showing a functional configuration example of an information processing server according to a first embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<Configuration of Information Processing Server>

Next, a functional configuration example of an information processing server will be described with reference to FIG. 1. Note that some of functional blocks to be described with reference to the attached drawings may be integrated, and any of the functional blocks may be divided into separate blocks. In addition, a function to be described may be implemented by another block. In addition, a functional block to be described as hardware may be realized by software, and vice versa. The information processing server is disposed outside a mobile object such as a vehicle.

A control unit 104 includes, for example, a central processing unit (CPU) 110, a random access memory (RAM) 111, and a read-only memory (ROM) 112, and controls operation of each unit of an information processing server 100. The control unit 104 causes each unit included in the control unit 104 to fulfill its function, by causing the CPU 110 to deploy, in the RAM 111, a computer program stored in the ROM 112 and to execute the computer program. In addition to the CPU 110, the control unit 104 may further include a graphics processing unit (GPU) or a dedicated circuit suitable for execution of machine learning processing or neural network processing, and the GPU or the circuit may execute processing of a model processing unit 114.

An image data acquisition unit 113 acquires image data transmitted from an external apparatus such as a vehicle operated by a user. The image data acquisition unit 113 stores the acquired image data in a storage unit 103. The acquired image data is input to a machine learning model (also simply referred to as a learning model) of an inference stage in order to obtain an inference result with respect to the acquired image data. Further, the image data acquired by the image data acquisition unit 113 may be used to train a model of the model processing unit 114.

The model processing unit 114 includes a machine learning model according to the present embodiment, and performs processing of a learning stage and processing of the inference stage of the learning model. In the learning model, for example, first and second image data are input, and a relative camera pose between a camera 1 that has captured the first image data and a camera 2 that has captured the second image data is predicted. The relative camera pose includes, for example, relative movement and relative rotation about three axes of another camera relative to one camera. In addition, the learning model predicts a depth map corresponding to each of the first and second image data.

The first image data and the second image data can be image data captured at different times (for example, time t and subsequent time t+1) by, for example, one camera mounted so as to face the front of the vehicle. At this time, since the camera moves between the time t and the time t+1 due to movement of the vehicle, camera poses of the camera that has captured the image data are different. Further, the first image data and the second image data may be two pieces of image data captured by, for example, two cameras mounted so as to face the front of the vehicle. Also in this case, camera poses of the cameras that have captured the pieces of image data are different. When prediction processing of the present embodiment is used for image data captured by two fixed cameras, camera calibration and camera abnormality detection can be performed from estimated camera parameters.

A DNN is put into a trained state as a result of performing processing of the learning stage. Thus, the DNN can perform camera pose prediction and depth map prediction (processing of the inference stage) for new image data by inputting the new image data to the trained DNN. The processing of the inference stage is performed in a case where inference processing is performed in the information processing server 100 by use of a trained model. The information processing server 100 executes the inference processing using the trained model on the information processing server 100 side, and transmits an inference result to an external apparatus such as a vehicle or an information processing apparatus. In general, the information processing server 100 can use more abundant calculation resources than the vehicle and the like, and thus is suitable in a case of performing an iterative operation as in prediction processing to be described later. In addition, it is possible to collect image data under a wide variety of circumstances by receiving and accumulating image data captured by various vehicles, so that it is possible to perform learning in response to a wider variety of circumstances.

A prediction result providing unit 115 provides information on the depth map and the camera pose predicted by the model processing unit 114 to the external apparatus such as the vehicle that has transmitted the image data.

A communication unit 101 is, for example, a communication device including a communication circuit and the like, and communicates with the external apparatus such as the vehicle or the information processing apparatus through a network such as the Internet. The communication unit 101 receives an actual image transmitted from the external apparatus such as the vehicle or the information processing apparatus, and transmits a camera parameter and a depth map predicted by the learning model to the vehicle. A power supply unit 102 supplies electric power to each unit in the information processing server 100. The storage unit 103 is a nonvolatile memory such as a hard disk or a semiconductor memory. The storage unit 103 stores trained parameters and training data of a DNN to be described later.

Example of Learning Model in Model Processing Unit

Next, a description will be given of an example of a learning model in the model processing unit 114 according to the present embodiment. Note that, in the following description, a case where two pieces of image data captured by one camera mounted on a vehicle at time t and subsequent time t+1 are input to the model processing unit 114 will be described as an example.

A configuration of the model processing unit 114 and a processing example of the learning model included in the model processing unit 114 will be described with reference to FIG. 2. The model processing unit 114 includes a DNN_D 201, a DNN_P 202, an image conversion unit 203, a loss calculation unit 204, and an iteration control unit 205. In addition, the model processing unit 114 includes the learning model. The learning model according to the present embodiment includes, for example, the DNN_D 201, the DNN_P 202, the image conversion unit 203, the loss calculation unit 204, and the iteration control unit 205.

The depth map prediction unit 201 (hereinafter, also referred to as the DNN_D 201) includes one or more deep neural networks (DNNs) as an example of a machine learning model, and outputs a depth map 211 of input image data as a prediction result. For example, the DNN_D 201 outputs a depth map corresponding to image data at time t when the image data at the time t is input, and outputs a depth map corresponding to image data at time t+1 when the image data at the time t+1 is input. The depth map is, for example, information representing, in an image, a predicted depth (distance from a camera to an object) for each pixel value of an input image, and is represented in white as the object is closer to the camera and in black as the object is farther from the camera. Furthermore, as will be described later, the DNN_D 201 can perform iteration (an iterative operation) to output the depth map, thereby improving accuracy of the depth map to be predicted. At this time, the DNN_D 201 can output a depth map in current iteration by inputting the image data, a depth map predicted from previous iteration, and a gradient of a loss related to the depth map to be described later. The DNN_D 201 may include, for example, a convolutional neural network (CNN), an auto encoder, or the like.

The camera pose prediction unit 202 (also referred to as the DNN_P 202) includes one or more DNNs as an example of a machine learning model, and outputs a relative camera pose 212 between two pieces of input image data as a prediction result. For example, when two pieces of image data at time t and time t+1 are input, the DNN_P 202 outputs a relative camera pose (for example, a movement amount and a rotation amount around three axes of the camera) between the pieces of image data at the time t and the time t+1. Furthermore, as will be described later, the DNN_P 202 can perform iteration to output the camera pose as the prediction result, thereby improving accuracy of the camera pose to be predicted. At this time, the DNN_P 202 can output a camera pose in current iteration by inputting the two pieces of image data, a camera pose predicted from previous iteration, and a gradient of a loss related to the camera pose to be described later. The DNN_P 202 can output a relative camera pose $P(I_t, I_{t+1})$ corresponding to a case where the camera pose changes from the time t to the time t+1. Furthermore, the DNN_P 202 can output a relative camera pose $P(I_{t+1}, I_t)$ from the time t+1 to the time t. The DNN_P 202 may be configured by, for example, a convolutional neural network (CNN) or the like.

The image conversion unit 203 converts image data captured at one time by using the predicted (relative) camera pose and depth map, and generates a converted image 213 corresponding to another time. For example, as illustrated in FIG. 3A, image data 301 captured at the time t, a depth map 302 estimated for the image data 301 at the time t, and a relative camera pose 303 from the time t to the time t+1 are input to the image conversion unit 203. Then, the image conversion unit 203 generates a converted image 304 corresponding to the time t+1 on the basis of the input data.

Here, the image conversion by the image conversion unit 203 corresponds to applying image conversion based on the predicted relative camera pose and depth map to the image data captured by one camera to reproduce virtual image data captured by another camera. Therefore, as the (relative) camera pose (and the depth map) predicted from the image data at the time t and the image data at the time t+1 is (are) more accurate, an error between the image data at the time t+1 and the converted image 304 corresponding to the time t+1 becomes smaller. Conversely, in a case where the error between the actual image data at the time t+1 and the converted image 304 corresponding to the time t+1 is large, the predicted camera pose or depth map is not accurate. Therefore, by repeating prediction of the predicted camera pose or depth map so that a difference between the converted image corresponding to the time t+1 and the actual image data at the time t+1 becomes smaller, it is possible to obtain a (relative) camera pose and a depth map with high accuracy.

Note that the image conversion unit 203 can perform image conversion using image data $I_{t+1}$, the relative camera pose $P(I_{t+1}, I_t)$, and a depth map $D_{t+1}$, in addition to the image conversion using image data $I_t$, the relative camera pose $P(I_t, I_{t+1})$, and a depth map $D_t$. For example, as illustrated in FIG. 3B, the image conversion unit 203 can generate a converted image 314 corresponding to the time t by inputting image data 311 captured at the time t+1, a depth map 312 predicted on the basis of the image data at the time t+1, and a relative camera pose 313 ($P(I_{t+1}, I_t)$). In this manner, high prediction accuracy can be realized by converging optimization so as to reduce an error in conversion in both directions of the image conversion from the time t to the time t+1 and the image conversion from the time t+1 to the time t. Furthermore, in a case where a DNN is trained, if there is a pair of images, double learning is possible, and thus learning can be efficiently performed with less training data.

The loss calculation unit 204 calculates a loss 214 based on an error between a captured image and a converted image. For example, the loss calculation unit 204 may include, in the loss, an error between the image data $I_{t+1}$ and the converted image corresponding to the time t+1 output from the image conversion unit 203 (for example, the sum of squares of differences between pixel values). Furthermore, the loss calculation unit 204 may further include, in the loss, an error between the image data $I_t$ and the converted image corresponding to the time t output from the image conversion unit 203 (for example, the sum of squares of differences between pixel values). For example, when the image data $I_t$ and the converted image corresponding to the time t output from the image conversion unit 203 are used, as illustrated in FIG. 4A, the loss calculation unit 204 calculates a loss 403 regarding a camera pose using image data 401 that is the image data $I_t$ and a converted image 402 corresponding to the time t.

The loss calculation unit 204 may calculate a loss using an error based on an image feature, a structural similarity (SSIM) index, or the like in addition to or instead of the error between the image data and the converted image. For example, the loss calculation unit 204 may extract feature amounts of the image data $I_{t+1}$ and the converted image corresponding to the time t+1 using another DNN trained in advance to extract a predetermined feature amount. In this case, the error based on the image feature may be calculated on the basis of a difference between the extracted feature amounts. Of course, the loss calculation unit 204 may calculate an error based on an image feature for the image data $I_t$ and the converted image corresponding to the time t.

The loss calculation unit 204 may further calculate a loss in consideration of an error between a depth map predicted from a captured image and a depth map subjected to image conversion by the image conversion unit 203. For example, the loss calculation unit 204 calculates a loss 413 regarding a depth map by using a depth map 411 at the time t and a converted image 412 of the depth map corresponding to the time t. At this time, for example, the loss calculation unit 204 takes into account a difference between pixel values (depth values) of two depth maps to be compared. The loss calculation unit 204 may further take into account, in addition to or instead of this, a difference in gradient (smoothness of depth) between the pixel values of the two depth maps to be compared.

Furthermore, in the image conversion, the loss calculation unit 204 may mask an occlusion region so that the occlusion region is not used for error calculation. For example, in a case where a converted image corresponding to the time t+1 is obtained from the image data at the time t, prediction accuracy cannot be essentially obtained for a region appearing in an image only at the time t+1. Therefore, the loss calculation unit 204 specifies an occlusion region using the depth map at the time t and the depth map at the time t+1, and stores mask information indicating the occlusion region in the storage unit 103. The mask information indicating the occlusion region may be, for example, binary data having 0 or 1, and a region where accurate prediction cannot be obtained in the converted image corresponding to the time t+1 may be set as 0, and a region where accurate prediction can be obtained therein may be set as 1.

For example, the loss calculation unit 204 can calculate a loss L as follows as an example.

$$L=(I_t-I_t')^2+(I_{t+1}-I_{t+1}')^2+(D_t-D_t')^2+(D_{t+1}-D_{t+1}')^2$$

where $I_t'$ represents a converted image corresponding to t, $I_{t+1}'$ represents a converted image corresponding to t+1, $D_t$ represents a depth map predicted from image data at time t, and $D_t'$ represents a converted image of the depth map corresponding to the time t. Further, $D_{t+1}$ represents a depth map predicted from image data at time t+1, and $D_{t+1}'$ represents a converted image of the depth map corresponding to the time t+1.

The iteration control unit 205 controls an iterative operation (that is, iteration) in order to realize optimization by the DNN_D 201 and the DNN_P 202. As described above, the DNN_D 201 improves the accuracy of the depth map to be predicted by the iterative operation. Specifically, as illustrated in FIG. 5, for example, image data at time t, a depth map 502 predicted in immediately previous (for example, Nth) iteration for the image data at the time t, and a gradient of a loss 503 regarding the depth map are input to the DNN_D 201. Then, the DNN_D 201 outputs a depth map 504 in (N+1st) iteration. In computation by iteration, the depth map 502 of the Nth iteration and the gradient of the loss 503 regarding the depth map are updated for each iteration. The gradient of the loss 503 regarding the depth map at the time t is a gradient of a depth map ($D_t$) at the time t in the loss (for example, partial differentiation by the $D_t$ in a cost function of the loss L). Further, a gradient of a loss related to the depth map at time t+1 is a gradient of a depth map ($D_{t+1}$) at the time t+1 in the loss (for example, partial differentiation by the $D_{t+1}$ in a cost function of the loss L).

The DNN_P 202 improves the accuracy of the camera pose to be predicted by the iterative operation as described above. Specifically, as illustrated in FIG. 6, for example, image data 601 at time t and time t+1, a camera pose 602 predicted in previous (for example, Nth) iteration with respect to the image data 601, and a gradient of a loss 603 regarding the camera pose are input to the DNN_P 202. Then, the DNN_P 202 outputs a camera pose 604 in (N+1st) iteration. In computation by iteration, the camera pose 602 of the Nth iteration and the gradient of the loss 603 regarding the camera pose are updated for each iteration. The gradient of the loss 603 regarding the camera pose (from the time t to the time t+1) is a gradient of the camera pose from the time t to the time t+1 in the loss (for example, partial differentiation by the camera pose in the loss L). Also, the gradient of the loss regarding the camera pose (from the time t+1 to the time t) is a gradient of the camera pose from the time t+1 to the time t in the loss (for example, partial differentiation by the camera pose in the loss L).

The iteration control unit 205 repeats the iteration until the loss 214 converges. For example, in a case where the calculated loss 214 is equal to or less than a threshold for a predetermined number of times, the iteration control unit 205 determines that the loss 214 has converged and terminates the iteration.

<Series of Operations of Prediction Processing in Model Processing Unit>

Next, a series of operations of prediction processing (of camera parameters and depth maps) in the model processing unit 114 will be described with reference to FIG. 7. Note that the present processing is implemented by the CPU 110 (or the GPU) of the control unit 104 deploying, in the RAM 111, a program stored in the ROM 112 and executing the program. Note that a learning model of the model processing unit 114 of the control unit 104 is executed in a trained state (that is, the DNN_D 201 and the DNN_P 202 described above are in a trained state).

In S701, the image data acquisition unit 113 of the control unit 104 acquires two pieces of image data from an external apparatus such as a vehicle. The two pieces of image data are, for example, images captured by one camera mounted on the vehicle at time t and subsequent time t+1.

In S702, the model processing unit 114 of the control unit 104 predicts depth maps ($D_t$ and $D_{t+1}$) for image data ($I_t$) at the time t and image data ($I_{t+1}$) at the time t+1, respectively. Specifically, in the first iteration, the DNN_D 201 predicts the depth map ($D_t$) at the time t by inputting the image data ($I_t$). Furthermore, the DNN_D 201 predicts the depth map ($D_{t+1}$) at the time t+1 by inputting the image data ($I_{t+1}$). Note that, since the latest iteration has not been executed at the time of this step, the depth map 502 of the latest iteration and the gradient of the loss 503 regarding the depth map are not input to the DNN_D 201.

In S703, the model processing unit 114 predicts a relative camera pose $P(I_t, I_{t+1})$ from the image data ($I_t$) at the time t to the image data ($I_{t+1}$) at the time t+1. Furthermore, the model processing unit 114 predicts a relative camera pose $P(I_{t+1}, I_t)$ from the image data ($I_{t+1}$) at the time t+1 to the image data ($I_t$) at the time t. Specifically, in the first iteration, the DNN_P 202 predicts the relative camera pose $P(I_t, I_{t+1})$ by inputting the image data ($I_t$) and the image data ($I_{t+1}$). Furthermore, the DNN_P 202 predicts the relative camera pose $P(I_{t+1}, I_t)$ by inputting the image data ($I_t$) and the image data ($I_{t+1}$). Note that, since the latest iteration has not been executed at the time of this step, the camera pose 602 of the latest iteration and the gradient of the loss 603 regarding the camera pose are not input to the DNN_P 202.

In S704, the image conversion unit 203 performs image conversion on the image data ($I_t$) at the time t and the image data ($I_{t+1}$) at the time t+1 using the predicted depth maps and camera poses. Specifically, the image conversion unit 203 generates a converted image corresponding to the time t+1 by using the image data ($I_t$) at the time t, the depth map ($D_t$) at the time t, and the relative camera pose $P(I_t, I_{t+1})$. Furthermore, the image conversion unit 203 generates a converted image corresponding to the time t by using the image data ($I_{t+1}$) at the time t+1, the depth map ($D_{t+1}$) at the time t+1, and the relative camera pose $P(I_{t+1}, I_t)$.

Furthermore, the image conversion unit 203 generates a converted image ($D_{t+1}'$) having depth corresponding to the time t+1 by using the relative camera pose $P(I_t, I_{t+1})$ and the depth map ($D_t$) at the time t. Moreover, the image conversion unit 203 generates a converted image ($D_t'$) having depth corresponding to the time t by using the relative camera pose $P(I_{t+1}, I_t)$ and the depth map ($D_{t+1}$) at the time t+1.

In S705, the loss calculation unit 204 calculates a loss including a difference between the data before conversion and the converted image. The loss may be, for example, the loss L described above. That is, the loss calculation unit 204 includes, in the loss, a square error between the images at the time t and the time t+1 and the converted images corresponding to the time t and the time t+1. Further, the loss calculation unit 204 includes, in the loss, a square error between the depth maps at the time t and the time t+1 and the depth maps corresponding to the time t and the time t+1. That is, the camera poses in both directions at the time t and the time t+1 and the depth maps at both the time t and the time t+1 are optimized to minimize the loss.

In S706, the iteration control unit 205 monitors the loss calculated by the loss calculation unit 204 and determines whether the loss satisfies a convergence condition. For example, in a case where the calculated loss is equal to or less than a threshold of a loss value for a predetermined number of times, the iteration control unit 205 determines that the convergence condition is satisfied and ends the series of processing. On the other hand, in a case where the iteration control unit 205 determines that the calculated loss is not equal to or less than the threshold of the loss value for the predetermined number of times, the processing proceeds to S707.

In S707, the iteration control unit 205 calculates a gradient of a loss regarding the depth map on the basis of the loss calculated in S705. The gradient of the loss regarding the depth map can be calculated for each depth map at time t and time t+1. A gradient of the depth map ($D_t$) at the time t in the loss is, for example, partial differentiation by the $D_t$ in the loss L. Further, a gradient of the depth map ($D_{t+1}$) at the time t+1 in the loss is, for example, partial differentiation by the $D_{t+1}$ in the loss L.

The iteration control unit 205 predicts a depth map ($D_t$, $D_{t+1}$) in new iteration by using the gradient of the loss regarding the depth map, current iteration (that is, a predicted result in S702), and each image data ($I_t$, $I_{t+1}$).

In S708, the iteration control unit 205 calculates a gradient of a loss regarding the camera pose on the basis of the loss calculated in S705. The gradient of the loss regarding the camera pose can be calculated for each of the relative camera poses $P(I_t, I_{t+1})$ and $P(I_{t+1}, I_t)$. The gradient of the camera pose $P(I_t, I_{t+1})$ in the loss is, for example, partial differentiation by the camera pose $P(I_t, I_{t+1})$ in the loss L. Furthermore, the gradient of the camera pose $P(I_{t+1}, I_t)$ in the loss is, for example, partial differentiation by the camera pose $P(I_{t+1}, I_t)$ in the loss L.

The iteration control unit 205 predicts relative camera poses ($P(I_t, I_{t+1})$ and $P(I_{t+1}, I_t)$) in new iteration by using the gradients of the losses regarding the camera poses, current iteration (that is, predicted results in S703), and the image data ($I_t$, $I_{t+1}$).

When the processing of S708 ends, the iteration control unit 205 advances the processing to S704 and repeats the processing of S704 to S708 so as to continue the iteration processing.

As described above, in the prediction processing in the model processing unit 114, the loss obtained by comparing the original image data with the converted image obtained from the estimated camera parameter and depth map is calculated, and the depth map and the camera pose are optimized by the iterative operation by using the gradient of the loss related to the depth map and the gradient of the loss related to the camera parameter. In this way, the camera parameter or the depth map predicted by the DNN can be corrected according to the gradient, and prediction accuracy can be improved as compared with a result predicted by one process by the DNN.

Although not explicitly described in the above prediction processing, the model processing unit 114 can transmit the finally obtained camera pose and depth map to an external apparatus such as a vehicle. That is, the model processing unit 114 can receive two images to be processed from the external apparatus such as the vehicle, and return the depth maps and the camera parameters predicted from the images to the external apparatus. In this way, the external apparatus such as the vehicle can perform traveling control such as automated driving while appropriately acquiring an inference result for a captured image from the information processing server 100.

Note that the series of operations of the prediction processing described above is an operation performed by a learning model of the model processing unit 114 at an inference stage (that is, trained). When the learning model is trained, the model processing unit 114 may add processing of updating weight parameters of the DNN_D 201 and the DNN_P 202 in addition to the processing of S701 to S708 described above. Specifically, after the loss is calculated in S705, back propagation using a gradient of a loss may be performed to update the weight parameter of each DNN. Alternatively, the loss including the difference between the data before the conversion and the converted image may be calculated similarly to S705 by using the final camera pose and depth map after it is determined that the convergence condition has been satisfied (that is, after the iterative operation is ended) in S706. In this case, all the calculated losses may be accumulated over the training data, and backpropagation of the DNN may be performed on the basis of the accumulated losses.

Furthermore, in the above-described example, an example in which the model processing unit 114 generates the depth map on the basis of the acquired image has been described.

However, the model processing unit 114 may estimate the camera parameter by using a depth map generated by light detection and ranging (Lidar) or radar of a vehicle or the like.

Second Embodiment

Next, a second embodiment of the present invention will be described. In the above-described embodiment, the case where the prediction processing based on the learning model is executed in the information processing server 100 has been described as an example. However, the present embodiment is applicable not only to the case where the prediction processing is performed in the information processing server but also to a case where the processing is performed in a vehicle as an example of a mobile object. That is, a learning model of a model processing unit operates in the vehicle, and a camera parameter and a depth map can be predicted in the vehicle. Hereinafter, a functional configuration example of a vehicle in such an embodiment will be described. Note that, in the following example, a case where a control unit 808 is controller incorporated in a vehicle 800 will be described as an example. However, an information processing apparatus having constituent elements of the control unit 808 may be mounted on the vehicle 800. That is, the vehicle 800 may be a vehicle equipped with an information processing apparatus including constituent elements such as a central processing unit (CPU) 810 and a model processing unit 814 included in the control unit 808.

In a case where processing of an inference stage of the learning model is performed in the vehicle, for example, the information processing server 100 provides information on a trained model (for example, a weight parameter of a neural network after training) to the vehicle 800. In this way, the vehicle 800 can use the latest trained model trained by using various training data collected in the information processing server 100.

<Configuration of Vehicle>

Figure 8:
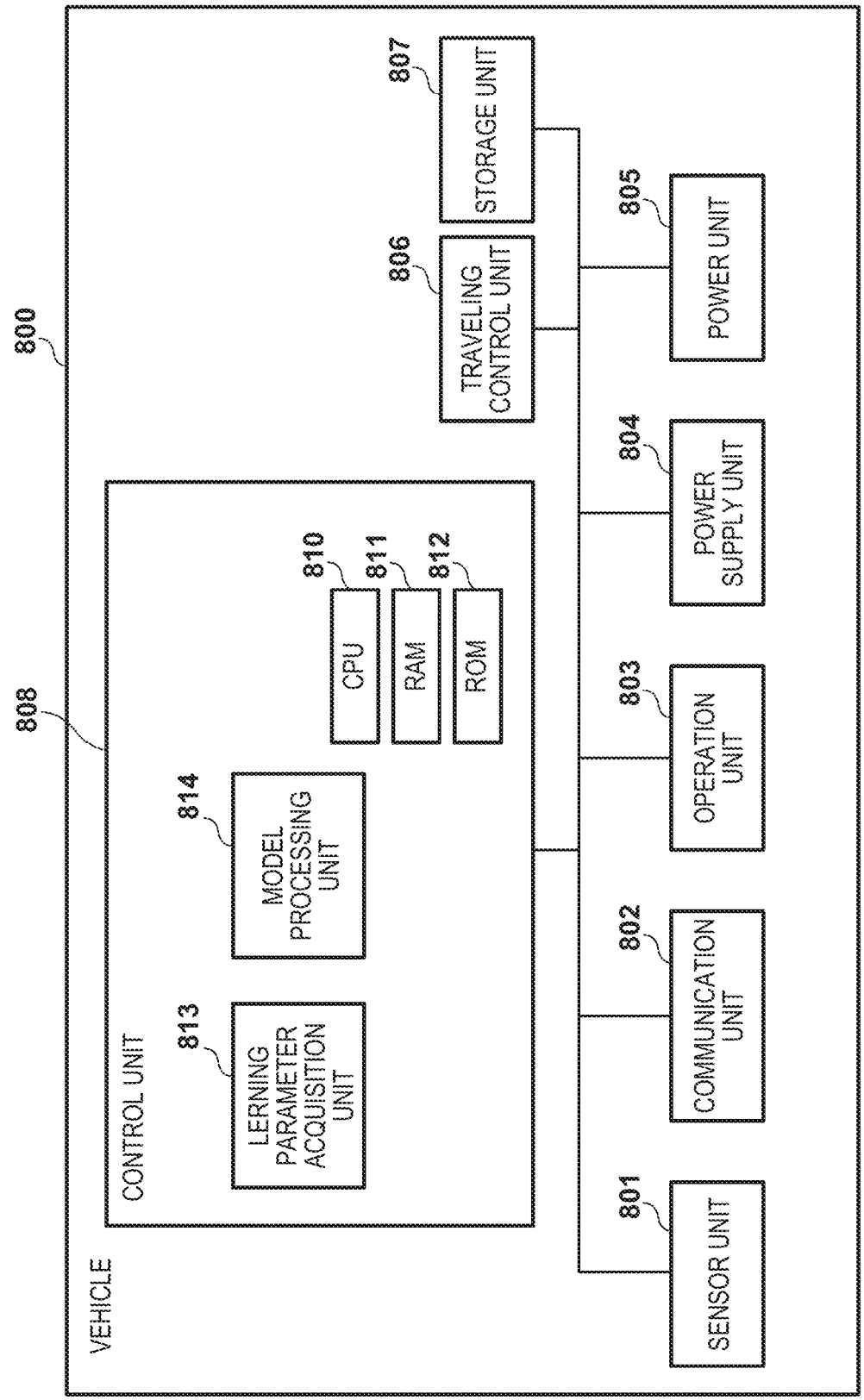
FIG. 8 is a block diagram showing a functional configuration example of a vehicle according to a second embodiment.

A functional configuration example of the vehicle 800 according to the present embodiment will be described with reference to FIG. 8. Note that some of functional blocks to be described with reference to the attached drawings may be integrated, and any of the functional blocks may be divided into separate blocks. In addition, a function to be described may be implemented by another block. In addition, a functional block to be described as hardware may be realized by software, and vice versa.

A sensor unit 801 includes a camera (an image capturing device) that outputs a captured image of a forward view (or captured images of a forward view, a rear view, and a view of surroundings) from the vehicle. The sensor unit 801 may further include a light detection and ranging (Lidar) that outputs a range image obtained by measurement of a distance to an object in front of the vehicle (or distances to objects in front of, in the rear of, and around the vehicle). The captured image is used, for example, for prediction processing in the model processing unit 814. In addition, the sensor unit 801 may include various sensors that output acceleration, position information, a steering angle, and the like of the vehicle 800.

A communication unit 802 is a communication device including, for example, a communication circuit, and communicates with the information processing server 100, a transportation system located around the vehicle, and the like through, for example, Long Term Evolution (LTE), LTE-Advanced, or mobile communication standardized as the so-called fifth generation mobile communication system (5G). The communication unit 802 acquires information of the learning model from the information processing server 100. In addition, the communication unit 802 receives a part or all of map data, traffic information, and the like from another information processing server or the transportation system located around the vehicle.

An operation unit 803 includes operation members and members that receive input for driving the vehicle 800. Examples of the operation members include a button and a touch panel installed in the vehicle 800. Examples of the members that receive such input include a steering wheel and a brake pedal. A power supply unit 804 includes a battery including, for example, a lithium-ion battery, and supplies electric power to each unit in the vehicle 800. A power unit 805 includes, for example, an engine or a motor that generates power for causing the vehicle to travel.

A traveling control unit 806 uses a result of prediction processing (for example, a camera pose or a depth map) output from the model processing unit 814 to estimate movement of the vehicle 800 and recognize external environment, thereby controlling the travel of the vehicle 800. Note that the movement estimation, the external environment recognition, and the traveling control can be performed using known methods. Note that, as an example, the traveling control unit 806 is described as a constituent element separate from the control unit 808 in the description of the present embodiment, but may be included in the control unit 808.

A storage unit 807 includes a nonvolatile large-capacity storage device such as a semiconductor memory. The storage unit temporarily stores various sensor data, such as an actual image, output from the sensor unit 801. In addition, for example, the storage unit stores parameters of the trained model received from the external information processing server 100 via the communication unit 802.

The control unit 808 includes, for example, the CPU 810, a random access memory (RAM) 811, and a read-only memory (ROM) 812, and controls operation of each unit of the vehicle 800. Furthermore, the control unit 808 acquires image data from the sensor unit 801 and executes the above-described prediction processing. The control unit 808 causes units, such as the model processing unit 814, included in the control unit 808 to fulfill their functions, by causing the CPU 810 to deploy, in the RAM 811, a computer program stored in the ROM 812 and to execute the computer program.

The CPU 810 includes one or more processors. The RAM 811 includes a volatile storage medium such as a dynamic RAM (DRAM), and functions as a working memory of the CPU 810. The ROM 812 includes a nonvolatile storage medium, and stores, for example, a computer program to be executed by the CPU 810 and a setting value to be used when the control unit 808 is operated. Note that a case where the CPU 810 implements the processing of the model processing unit 814 will be described as an example in the following embodiment, but the processing of the model processing unit 814 may be implemented by one or more other processors (for example, graphics processing units (GPUs)) (not shown).

A learning parameter acquisition unit 813 acquires information of the trained model (learning parameter) from the information processing server 100 and stores the information in the storage unit 807.

The model processing unit 814 has a learning model having the same configuration as the configuration illustrated in FIG. 2 in the first embodiment, and the model processing unit 814 executes processing of an inference stage of the learning model. The processing of the inference stage to be performed by the model processing unit 814 can be performed as with the prediction processing described in the first embodiment.

<Main Configuration for Traveling Control of Vehicle>

Figure 9:
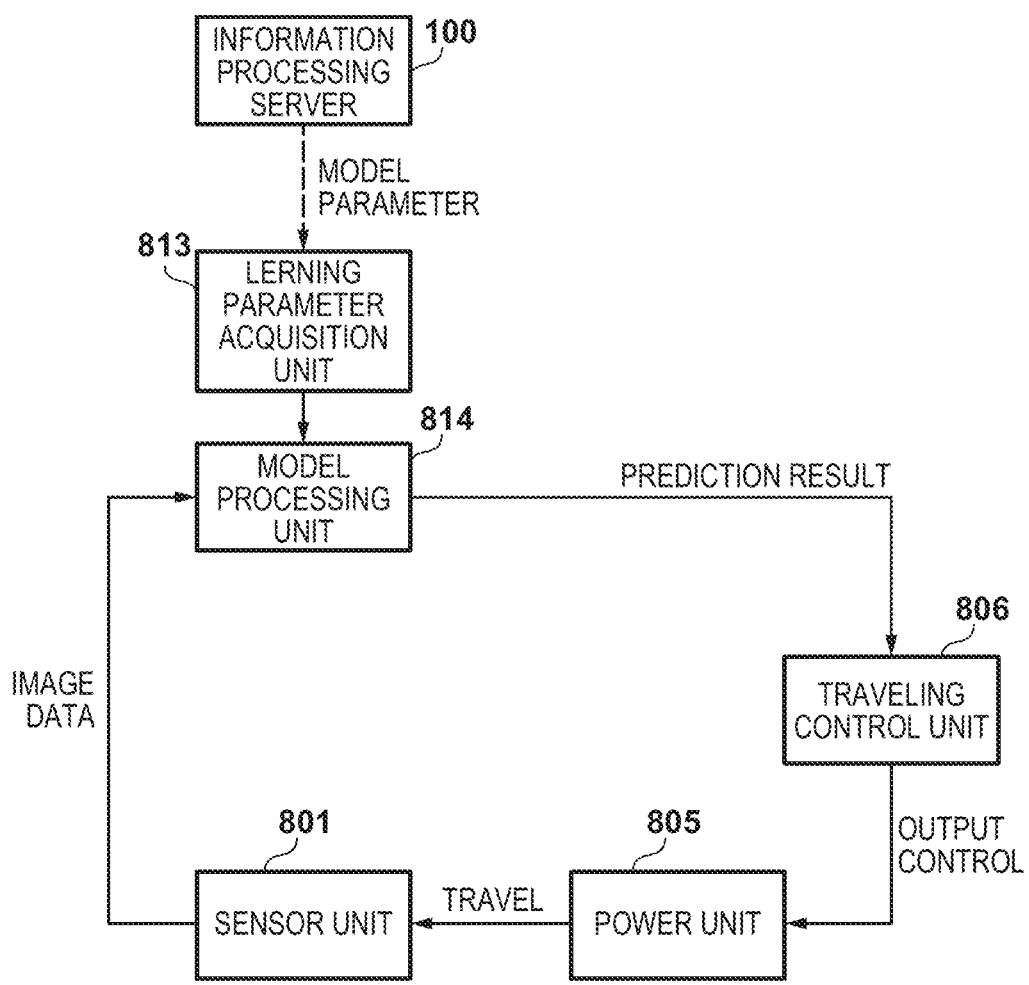
FIG. 9 is a diagram showing a main configuration for traveling control of the vehicle according to the second embodiment.

Next, a main configuration for traveling control of the vehicle 800 will be described with reference to FIG. 9. The sensor unit 801 captures, for example, images of a forward view from the vehicle 800, and outputs image data on the captured images a predetermined number of times per second. The image data output from the sensor unit 801 are input to the model processing unit 814 of the control unit 808. The image data input to the model processing unit 814 is used for prediction processing of a camera pose and a depth map (processing of an estimation stage). The model processing unit 814 executes the prediction processing by inputting the image data output from the sensor unit 801, and outputs the camera pose and the depth map to the traveling control unit 806.

On the basis of the prediction result of the camera pose and the depth map, and various sensor information such as the acceleration and the steering angle of the vehicle obtained from the sensor unit 801, the traveling control unit 806 performs vehicle control for the vehicle 800 by performing movement estimation, external environment recognition, and the like, and outputting a control signal to the power unit 805, for example. The movement estimation, the external environment recognition, and the vehicle control using the camera pose and the depth map can be performed using known methods. The power unit 805 controls generation of power according to the control signal from the traveling control unit 806.

The learning parameter acquisition unit 813 acquires information of the learning model transmitted from the information processing server 100. The acquired data are used for training the DNNs of the model processing unit 814.

As described above, in the present embodiment, the learning model for predicting the camera pose and the depth map is executed in the model processing unit 814 in the vehicle 800. That is, the vehicle calculates a loss obtained by comparing the original image data with the converted image obtained from the estimated camera parameter and the depth map, and optimizes the depth map and the camera pose by the iterative operation by using the gradient of the loss related to the depth map and the gradient of the loss related to the camera parameter. In this way, in the learning model executed in the vehicle, prediction accuracy can be enhanced more than a result predicted by one process by the DNN.

Summary of Embodiments (1) According to the above embodiment, an information processing method executed in an information processing apparatus, the method comprising:
predicting a depth map by inputting a first image or a second image paired with the first image to a first machine learning model;
predicting relative movement and rotation of an image capturing device that captures the first image and the second image by inputting the first image and the second image to a second machine learning model;
generating a first converted image in which image conversion based on the predicted relative movement and rotation from the first image to the second image and the depth map predicted for the first image is applied to the first image;
calculating a loss including an error between the first converted image and the second image; and
repeatedly predicting the relative movement and rotation by inputting a gradient of the loss regarding the relative movement and rotation, the first converted image, and the first image and the second image to the second machine learning model, and converging the loss including the error between the new first converted image and the second image based on the newly predicted relative movement and rotation, is provided.

According to such an embodiment, by giving the gradient of the loss regarding the relative movement and rotation to the machine learning model and performing iterative calculation, it is possible to improve estimation accuracy of a camera pose in a case where the camera pose is estimated using the machine learning model.

(2) In the information processing method according to the above embodiment, further comprising:
generating a second converted image in which image conversion based on the predicted relative movement and rotation from the second image to the first image and the depth map predicted for the second image is applied to the second image; and
calculating the loss including an error between the second converted image and the first image,
wherein convergence of the loss includes repeated prediction of the relative movement and rotation by inputting a gradient of the loss regarding the relative movement and rotation, the second converted image, and the first image and the second image to the second machine learning model.

According to such an embodiment, since it is possible to compare data that is correct in both directions of conversion from the first image to the second image and conversion from the second image to the first image, estimation accuracy can be further improved. In addition, it is possible to reduce an amount of training data required in a case where the machine learning model is trained.

(3) In the information processing method according to the above embodiment, wherein the loss includes both the error between the first converted image and the second image and the error between the second converted image and the first image.

According to such an embodiment, since both the loss of the first converted image and the loss of the second converted image are converged to be reduced, estimation accuracy of each of the first converted image and the second converted image can be improved.

(4) In the information processing method according to the above embodiment, further comprising:
generating a depth map for the first converted image; and
calculating the loss including an error between the depth map for the first converted image and the depth map for the first image,
wherein convergence of the loss includes repeated prediction of the depth map by inputting a gradient of the loss regarding the depth map, the depth map for the first converted image, and the first image to the first machine learning model.

According to such an embodiment, by applying iterative calculation using machine learning to prediction of the depth map, estimation of the depth map can be performed more accurately.

(5) In the information processing method according to the above embodiment, wherein the information processing apparatus is an information processing server arranged outside a mobile object.

According to such an embodiment, processing of the machine learning model can be executed in the information processing server having more calculation resources.

(6) In the information processing method according to the above embodiment, wherein the information processing apparatus is a mobile object including a vehicle.

By executing the information processing method in the mobile object including the vehicle, calibration and movement prediction of the image capturing device can be accurately performed in the mobile object.

The invention is not limited to the foregoing embodiments, and various variations/changes are possible within the spirit of the invention.

What is claimed is:

1. An information processing method executed in an information processing apparatus, the method comprising:
   predicting a depth map by inputting a first image or a second image paired with the first image to a first trained neural network;
   predicting relative movement and rotation of an image capturing device that captures the first image and the second image by inputting the first image and the second image to a second trained neural network;
   generating a first converted image in which image conversion based on the predicted relative movement and rotation from the first image to the second image and the depth map predicted for the first image is applied to the first image;
   calculating a loss including an error between the first converted image and the second image; and
   repeatedly predicting the relative movement and rotation by inputting a gradient of the loss regarding the relative movement and rotation, the first converted image, and the first image and the second image to the second trained neural network, and converging the loss including the error between the new first converted image and the second image based on the newly predicted relative movement and rotation, wherein the repeatedly predicting the relative movement and rotation and the converging the loss are performed without updating weight parameters of the second trained neural network.

2. The information processing method according to claim 1, further comprising:
   generating a second converted image in which image conversion based on the predicted relative movement and rotation from the second image to the first image and the depth map predicted for the second image is applied to the second image; and
   calculating the loss including an error between the second converted image and the first image,
   wherein convergence of the loss includes repeated prediction of the relative movement and rotation by inputting a gradient of the loss regarding the relative movement and rotation, the second converted image, and the first image and the second image to the second trained neural network.

3. The information processing method according to claim 2, wherein the loss includes both the error between the first converted image and the second image and the error between the second converted image and the first image.

4. The information processing method according to claim 1, further comprising:
   generating a depth map for the first converted image; and
   calculating the loss including an error between the depth map for the first converted image and the depth map for the first image,
   wherein convergence of the loss includes repeated prediction of the depth map by inputting a gradient of the loss regarding the depth map, the depth map for the first converted image, and the first image to the first trained neural network.

5. The information processing method according to claim 1, wherein the information processing apparatus is an information processing server arranged outside a mobile object.

6. The information processing method according to claim 1, wherein the information processing apparatus is a mobile object including a vehicle.

7. The information processing method according to claim 1, wherein the first image and the second image are images captured by a same image capturing device, and are captured at different times.

8. A non-transitory computer-readable storage medium storing a program for causing a computer to execute each step of an information processing method executed in an information processing apparatus, the information processing method comprising:
   predicting a depth map by inputting a first image or a second image paired with the first image to a first trained neural network;
   predicting relative movement and rotation of an image capturing device that captures the first image and the second image by inputting the first image and the second image to a second trained neural network;
   generating a first converted image in which image conversion based on the predicted relative movement and rotation from the first image to the second image and the depth map predicted for the first image is applied to the first image;
   calculating a loss including an error between the first converted image and the second image; and
   repeatedly predicting the relative movement and rotation by inputting a gradient of the loss regarding the relative movement and rotation, the first converted image, and the first image and the second image to the second trained neural network, and converging the loss including the error between the new first converted image and the second image based on the newly predicted relative movement and rotation, wherein the repeatedly predicting the relative movement and rotation and the converging the loss are performed without updating weight parameters of the second trained neural network.

* * * * *